Oct. 5, 1965    M. J. SPENO ETAL    3,209,911
SEPARATING CONVEYOR
Filed June 13, 1962
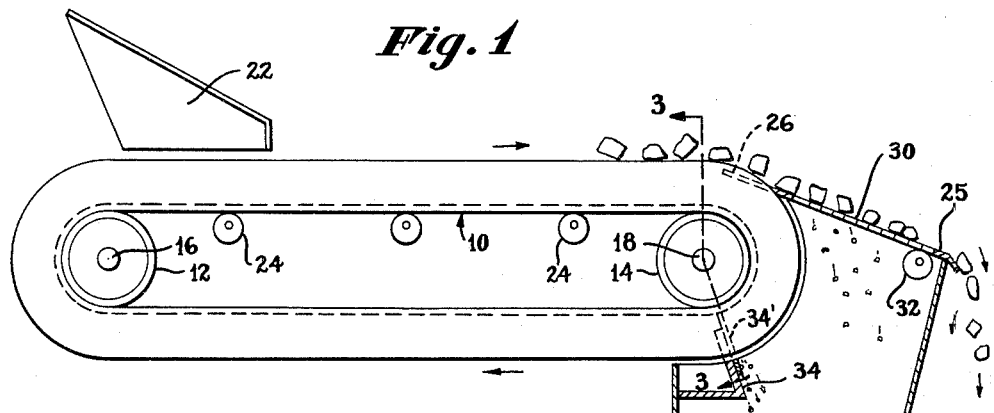
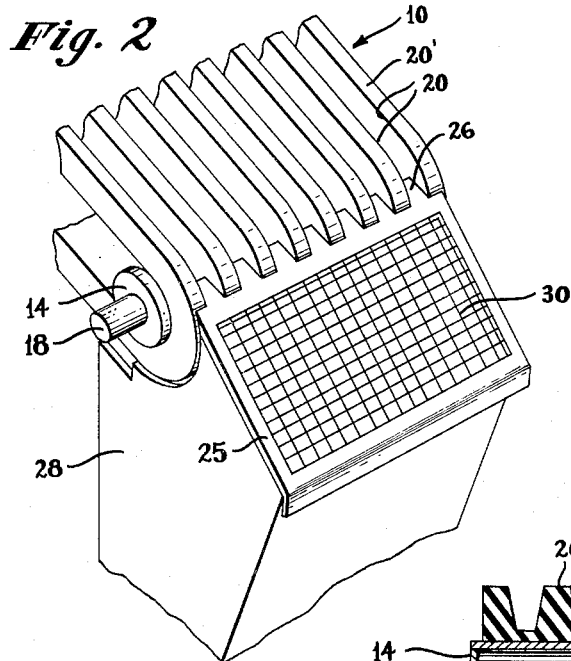
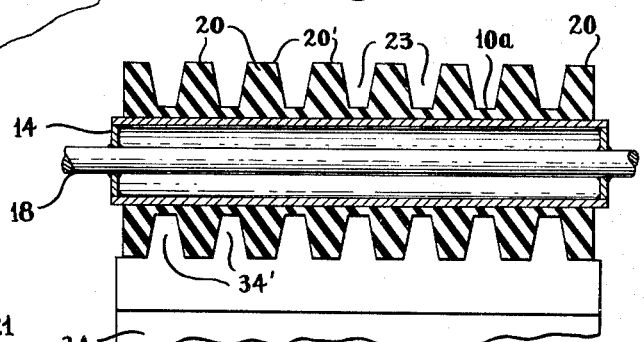
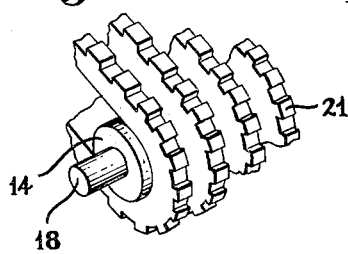
INVENTOR
MARTIN J. SPENO
ANTHONY T. BRUNO
BY Watson, Cole, Grindle + Watson
ATTORNEYS

United States Patent Office 3,209,911
Patented Oct. 5, 1965

3,209,911
SEPARATING CONVEYOR
Martin J. Speno, Syracuse, and Anthony T. Bruno, East Syracuse, N.Y., assignors to Frank Speno Railroad Ballast Cleaning Co. Incorporated, Ithaca, N.Y., a corporation of New York
Filed June 13, 1962, Ser. No. 202,147
4 Claims. (Cl. 209—102)

This invention relates to an endless conveyor separator for classifying discrete solid particles by size, and more particularly for separating such particles of a size up to a given maximum from those in excess of said maximum.

It is a primary object of the invention to provide such a separating conveyor which in addition to its separating function serves also to convey the two different sizes of particles to separate discharge points.

It is a further object to provide, in conjunction with a separating conveyor, a novel material discharge chute or device for removing the larger separated particles from the conveyor without interrupting the continued travel of the smaller particles thereon.

A still further object is to provide such a discharge chute which functions also as a secondary screening or sifting device for separating by gravity from the larger particles such residues of small or fine particles as may not have been completely removed by the primary separating action of the conveyor.

A further object yet is to arrange such a chute or secondary sifting device to return the smaller particles separated by it back to the main stream of small particles separated by the primary screening operation.

A further incidental feature of the invention consists in disposing a wiper or scraper element in engagement with the separating conveyor and in series relation with the discharge chute in such manner as to remove any smaller particles tending to remain lodged in the separating grooves of the conveyor.

The novel structure which we have devised for attaining these ends essentially comprises a flexible endless belt conveyor guided for continuous movement around suitable rolls or the like, and provided on its outer face with a series of uniformly spaced ribs extending parallel to each other and to the movement of the conveyor, so that the larger particles will be supported on the outer faces of the respective ribs to be removed therefrom at the end of the conveyor run by suitable removable chute or scraper means, while the smaller particles will for the most part drop into the grooves between adjoining ribs to be carried past the scraper or discharge chute and discharged at a separate location from the larger particles.

The specific structure of the preferred embodiment of the invention will be made more readily apparent by reference to the accompanying detailed description and drawings of the preferred exemplification of the invention.

In the drawings:

FIGURE 1 represents a generally diagrammatic side elevation of a separating conveyor incorporating the invention, FIGURE 2 is a somewhat enlarged fragmentary perspective view of the discharge end portion of the conveyor and the means for removing the separated particles therefrom, FIGURE 3 is a diagrammatical cross section on the line 3—3 of FIGURE 1, through the discharge roll in the plane of its associated wiper or scraper, a portion of which is shown in elevation, and FIGURE 4 is a fragmentary perspective view showing the left hand and portion of the discharge roll around which is guided a modified form of separating conveyor.

Referring now in detail to the accompanying drawings, the means for supporting and guiding the endless flexible belt 10 in an endless circuit is shown as comprising a pair of relatively horizontally spaced cylindrical rolls 12 and 14, respectively, having shafts 16 and 18 by which they may be mounted for rotation about parallel axes and continuously driven at a constant rotational speed by suitable conventional means not illustrated here and constituting no part of the present invention. As will be seen by reference to FIGURE 3 in conjunction with FIGURE 1, the inner surface 10A of the belt which engages the rolls 12 and 14 is of smooth sheet like configuration. However, the outwardly presented face of the belt is provided with a multiplicity of relatively uniformly spaced parallel ribs 20 which extend both parallel to each other and to the direction of the belt movement through its endless circuit. Thus, each of such ribs extends in a radial plane of each of the rolls 12 and 14. Preferably the ribs 20 are formed integrally with the inner or sheet like portion 10A of the belt and both the ribs and belt are formed of conventional materials such as flexible rubber or plastic reinforced by fabric, the ribs 20 necessarily being formed of a material having sufficient elasticity to permit some deflex around the rolls 14 and 22. If desired, however, the ribs 20 may be defined in each case by a row of relatively contiguous metal strips or studs individually secured to the flat portion 10A of the belt, the studs thus forming belt rib sections adapted to separate during flexing of the belt around the respective rolls 12 and 14.

Moreover, if desired, the integrally formed belt ribs may be provided with a series of relatively spaced raised bosses 21, as illustrated in FIGURE 4, for use in circumstances where the operative run of the conveyor may be upwardly inclined or it is otherwise desired to secure a tractive grip upon the material.

The conveyor belt 10 is provided with an upwardly presented horizontal operative run onto which the material to be separated is delivered by conventional means, exemplified by the feed hopper 22 in FIGURE 1.

By reference to FIGURES 2 and 3 it will be apparent that the relatively uniformly spaced ribs 20 define between them a multiplicity of sizing or separating groove 23 of uniform dimensions which determine the maximum size of the smaller particles to be separated by reception in such grooves. It will be moreover apparent that the particles too large for reception between adjoining ribs will be supported on the outwardly presented preferably flat faces 20' of the respective ribs and in many instances will extend across or bridge one or more of the grooves 23.

Such separation of the material into large and small particles occurs during movement of the operative run of the belt from left to right as seen in FIGURE 1. The efficiency of the sifting or separating may be improved by the provision of conventional belt vibrators, such as the eccentrics 24.

In the operation of the invention, separated particles of different size ranges are carried on the operative run of the conveyor to separate serially arranged discharge points at its discharge end, or in other words, at the location where it passes around the discharge roll 14. The first such discharge point or location is provided by the rigid chute or plate 25 for the larger particles. The plate has its forward edge portion resting slidably on the upper faces or surfaces 20' of the respective ribs at a location in which the belt is just beginning its return run around and under the discharge roll 14. To facilitate the removal of the larger particles, the chute or plate 25 is preferably provided at its forward edge with forwardly projecting teeth or fingers 26 positioned to extend slightly into the respective grooves 23 and beneath any larger particles which may bridge such grooves, whereby to afford a positive removal of such particles from the belt and onto the plate 25.

Plate or chute 25 may advantageously be supported by and sloped downwardly from the conveyor 10 across the upper end of a hopper or chute 28 positioned beneath the discharge roll for reception of the smaller particles. Such particles are normally carried beneath the teeth 26 of the discharge plate 25 in the bottom portions of the grooves 23. The depth of each such groove 23 is as least equal to and preferably substantially in excess of the maximum width at its mouth so that particles lodged in the bottom of the grooves will not be engaged or dislodged by the chute fingers 26 extending into the upper portions only of the grooves.

By its sloping disposition, the plate 25 causes the larger particles to move by gravity across and above the open upper end of the fine material hopper 28 to be discharged by gravity outside and rearwardly of such hopper. Since some of the fine particles may remain on the outer or upper surfaces 20' of the ribs and be delivered onto the discharge plate or chute 25 together with the coarser particles, it is desirable to utilize the chute also as a secondary screening or sifting device for substantially removing this residue of fine particles from the coarse particles. For this purpose the plate 25 may have its major body portion overlying the upper end of the hopper 28 and formed as a multiperforated sifting screen 30. These perforations are so proportioned that the larger particles will be prevented from passing through them, while the smaller particles will pass readily through them to fall into the hopper 28 and thus the primary stream of earlier separated fine particles delivered into the hopper directly from the belt grooves.

Both the sifting and the gravity conveying functions of the discharge chute or plate 25 may be enhanced in conventional manner by imparting rapid vibration thereto, as by means of the conventional rotating eccentric 32 shown diagrammatically in FIGURE 1.

In order to avoid lodging of fine particles in the grooves 23, with resulting clogging of these grooves, there is preferably provided a multi-toothed scraper 34, the teeth 34' of which are interdigitated with the respective ribs 20 for slidable scraping engagement with the sides and bottoms of the grooves 23. This scraper 34 is located at the beginning of the lower or return run of the belt conveyor and preferably is supported by and over the hopper 28 so that particles dislodged by it will fall into the hopper.

From the foregoing description it is believed that the operation of the invention will readily be apparent. Thus a mixture of large and small particles delivered in any suitable manner into the feed hopper 22 will in turn be deposited upon the upper horizontal run of the conveyor belt 10 near the beginning of such run. During its subsequent carriage by the belt toward the discharge end thereof, the finer particles of the material will be caused to fall between the ribs into the spaces 23. The efficiency of this action will be obviously increased by the operation of the eccentrics 24 which tend to rapidly vibrate the belt. The larger particles will remain supported on and across the tops of the ribs 20 and will be removed from the belt at the end of its operative run by means of the discharge plate 25 and its associated fingers 26. Thus, the larger particles will be carried across and over the top of the hopper 28 to be discharged over the rear edge of the plate 25. On the other hand, the finer particles within the grooves 23 will normally pass beneath the fingers 26 as well as the rest of the scraper 25 for delivery by gravity into the hopper 28. The few particles which may remain lodged between the ribs will then be removed by the scraper 34 to fall into the hopper. Obviously, either or both the hopper 28 and the discharge plate 25 may deliver their respectively discharged materials onto further conveying means for transportation to any desired point or points, though such further conveying means, being purely conventional, are not herein shown.

The invention has been found particularly useful in connection with the cleaning of railroad ballast in which the larger particles of clean ballast may be discharged over the top of plate 25, while the foreign smaller particles removed therefrom are separately discharged and carried away to any desired point. In this application we have shown and described only the preferred exemplification of our invention together with certain minor modifications thereof. However, we recognize that our invention is capable of other and different uses and embodiments, and that its several details may be modified in various ways, all without departing from our inventive concept as defined in the accompanying claims. Accordingly the drawings and description herein are to be construed as merely illustrative in nature and not as exclusive.

Having thus described our invention, we claim:

1. A separating conveyor for discrete solid particles, said conveyor having forward and rearward ends and comprising an upwardly presented generally horizontal, endless, flexible, imperforate conveyor surface moving from said forward end to said rearward end means, for depositing on said surface adjacent its forward end a mixture of large and small solid particles to be separated, a plurality of uniformly spaced ribs fixed on said surface end extending in the direction of said movement, said ribs defining a plurality of grooves of uniform depth, whereby smaller particles will drop into said grooves and larger particles will be supported on said ribs, in combination with a discharge plate adjacent said rearward end and having fingers extending forward therefrom between said ribs to guide the larger particles from said ribs onto said plate, said fingers being spaced from the bottoms of the respective grooves sufficiently to permit free movement past said fingers of particles within the size ranges capable of reception in said grooves.

2. A separating conveyor for discrete solid particles comprising an upwardly presented imperforate conveyor surface adapted to convey material in a predetermined, substantially horizontal direction, means for delivering onto said conveyor surface a mixture of said particles of varying sizes, a plurality of uniformly-spaced ribs fixed on said surface and extending in said direction, said ribs defining a plurality of grooves of uniform depth whereby smaller particles will drop into said grooves and larger particles will be supported on said ribs, in combination with a discharge plate having a substantially horizontal forward edge in scraping engagement with said ribs, and having fingers extending therefrom between said ribs to guide the larger particles from said ribs onto said plate, said fingers being uniformly spaced from the bottoms of the respective grooves a distance sufficient to permit free passage therebeneath of the smaller particles of a size capable of reception in said grooves.

3. A separating conveyor for discrete solid particles comprising an imperforate endless flexible conveyor belt, a pair of horizontally spaced rolls supporting said belt for movement through an endless circuit including a generally horizonal upper run, one of said rolls constituting a discharge roll toward and around which said upper run moves, a plurality of uniformly spaced parallel ribs on and extending outwardly from said belt, said ribs extending parallel to the movement of said belt through its circuit and defining between a series of parallel grooves for reception and conveyance of solid discrete particles of a size no greater than the width of said grooves, the outer faces of said ribs being adapted to support and convey relatively larger particles, a hopper having an open upper end beneath said discharge roll for reception of particles discharged by gravity from between said ribs as an incident to passage of the belt around said discharge roll, and means for transferring said larger particles from the belt at the inception of its passage around the discharge roll, said means including an inclined chute extending over and beyond said open upper end of the hopper, and including a perforated sifting screen above said hopper end for sifting therein smaller particles delivered with the larger particles onto the chute, and means for imparting vibration to said upper run of the belt and to said chute.

4. A separating conveyor for discrete solid particles comprising an imperforate endless flexible conveyor belt, a pair of horizontally spaced rolls supporting said belt for movement through an endless circuit including a generally horizontal upper run, one of said rolls constituting a discharge roll toward and around which said upper run moves, a plurality of uniformly spaced parallel ribs on and extending outwardly from said belt, said ribs extending parallel to the movement of said belt through its circuit and defining between them a series of parallel grooves for reception and conveyance of solid discrete particles of a size no greater than the width of said grooves, the outer faces of said ribs being adapted to support and convey relatively larger particles, a hopper having an open upper end beneath said discharge roll for reception of particles discharged by gravity from between said ribs as an incident to passage of the belt around said discharge roll, and means for transferring said larger particles from the belt at the inception of its passage around the discharge roll, said means including an inclined chute extending over and beyond said open upper end of the hopper, and including a perforated sifting screen above said hopper end for sifting therein smaller particles delivered with the larger particles onto the chute, and a scraper having scraper fingers extending into the grooves between the respective ribs at a location beneath said discharge roll, to discharge any particles therefrom and thereby to prevent clogging of said grooves.

References Cited by the Examiner

UNITED STATES PATENTS

| | | | |
|---|---|---|---|
| 278,325 | 5/83 | Farwell | 209—470 |
| 519,457 | 5/94 | Marsden | 209—261 |
| 979,200 | 12/10 | Prosser | 198—198 |
| 1,233,149 | 7/17 | Wall | 209—506 |
| 2,104,785 | 1/38 | Akeyson | 209—308 |
| 2,661,575 | 12/53 | Kennedy | 209—247 |
| 2,837,209 | 6/58 | Forbes | 209—78 |
| 2,922,645 | 1/60 | Murblut | 198—198 |

FOREIGN PATENTS 487,435    6/25    Germany.

ROBERT B. REEVES, *Primary Examiner.*

HERBERT L. MARTIN, HARRY B. THORNTON,
*Examiners.*